United States Patent [19]

George et al.

[11] Patent Number: 5,143,800

[45] Date of Patent: Sep. 1, 1992

[54] ELECTROCHEMICAL CELL APPARATUS HAVING COMBUSTED EXHAUST GAS HEAT EXCHANGE AND VALVING TO CONTROL THE REFORMABLE FEED FUEL COMPOSITION

[75] Inventors: Raymond A. George, Forest Hills; Delmer Q. Hoover, Churchill Boro; Larry A. Shockling; Philip Reichner, both of Plum Borough, all of Pa.

[73] Assignee: Westinghouse Electric Corp., Pittsburgh, Pa.

[21] Appl. No.: 559,110

[22] Filed: Jul. 25, 1990

[51] Int. Cl.⁵ ............................................. H01M 8/06
[52] U.S. Cl. ...................................... 429/20; 429/17; 429/34
[58] Field of Search ..................... 429/12, 17, 19, 20, 429/34

[56] References Cited

U.S. PATENT DOCUMENTS

| | | | |
|---|---|---|---|
| 3,718,506 | 2/1973 | Fischer et al. | 136/86 C |
| 4,395,468 | 7/1983 | Isenberg | 429/31 |
| 4,490,444 | 12/1984 | Isenberg | 429/31 |
| 4,729,931 | 3/1988 | Grimble | 429/17 |
| 4,808,491 | 2/1989 | Reichner | 429/13 |

Primary Examiner—R. Bruce Breneman
Attorney, Agent, or Firm—Daniel P. Cillo

[57] ABSTRACT

An electrochemical apparatus (10) is made having a generator section (22) containing electrochemical cells (16), a fresh gaseous feed fuel inlet (28), a gaseous feed oxidant inlet (30), gaseous spent fuel recirculation channels (46), and hot combusted exhaust gas exit channels (45), where the spent fuel recirculation channel (46) passes from the generator chamber (22) to combine with the fresh feed fuel inlet (28) at a circulation and mixing apparatus (50), where a reformable fuel mixture channel (51) passes between the mixing apparatus and reforming chamber (54) containing a reformable material, where a portion of the hot combusted exhaust gas exit channel (45) surrounds the reforming chamber (54), and where the fresh feed fuel inlet has a by-pass channel (62) into the gaseous spent fuel recirculation channel (46), said by-pass channel having valving to control fresh fuel feed flow to the gaseous spent fuel recirculation channel.

16 Claims, 1 Drawing Sheet

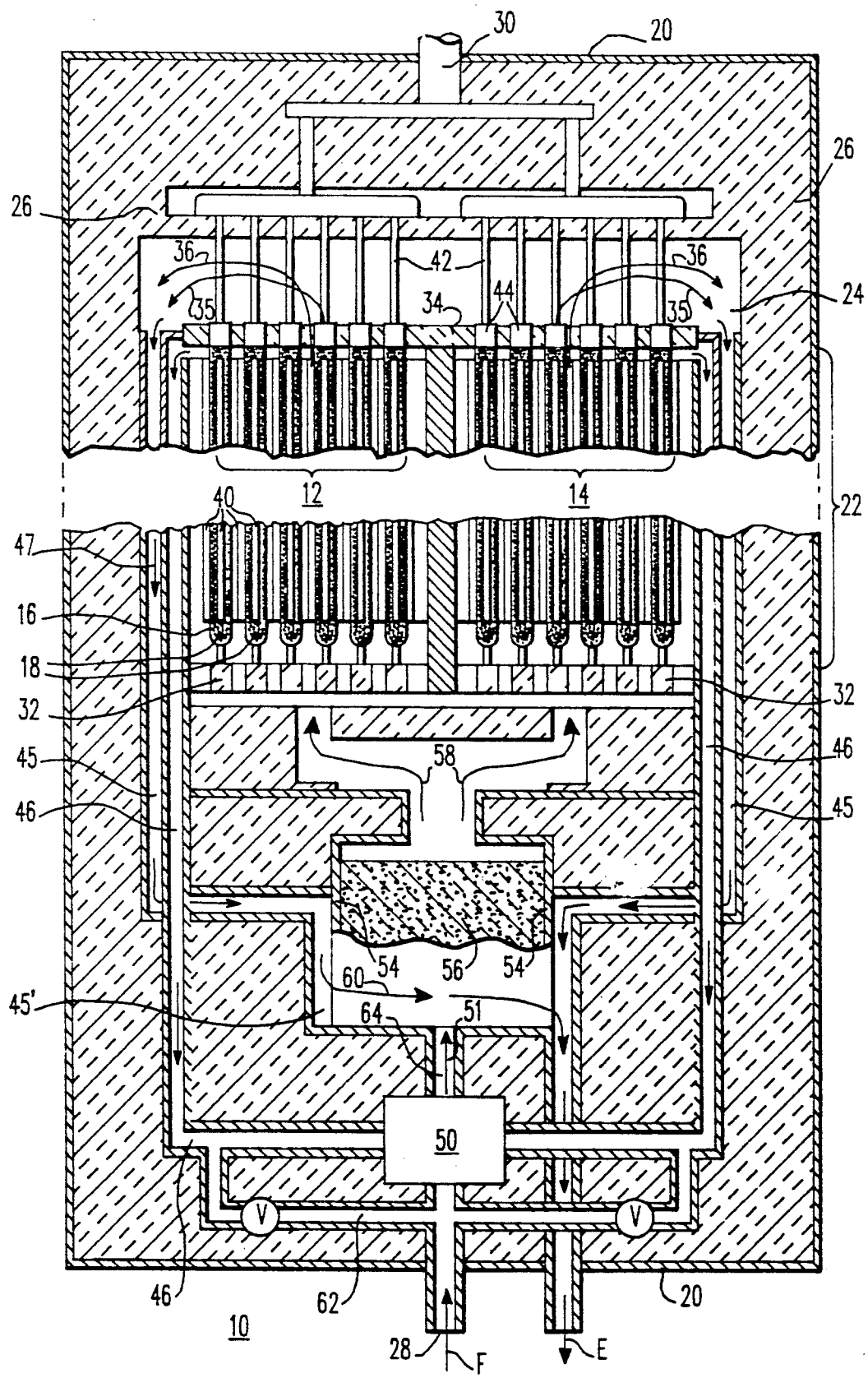

ELECTROCHEMICAL CELL APPARATUS HAVING COMBUSTED EXHAUST GAS HEAT EXCHANGE AND VALVING TO CONTROL THE REFORMABLE FEED FUEL COMPOSITION

BACKGROUND OF THE INVENTION

This invention relates to an electrochemical apparatus containing a plurality of electrochemical cells, each having an exterior fuel electrode, which can be contacted by a mixture of fresh feed fuel and recirculated spent fuel, which mixture contains water vapor and can pass through a reforming material prior to contacting the fuel electrodes, where recirculated, combusted exhaust gas surrounds and heats the reforming material, and fresh feed fuel and recirculated spent fuel can be mixed precisely by valving controls prior to contact with the cells.

High temperature, solid oxide electrolyte fuel cell generator apparatus and fuel cell configurations are well known, and taught, for example, in U.S. Pat. Nos. 4,395,468 and 4,490,444 respectively (Isenberg). There, feed fuel, either $H_2 + CO$, or previously reformed natural gas, is fed into the apparatus at one end and flows parallel to exterior fuel electrode surfaces of elongated fuel cells. Spent fuel is combusted with spent oxidant in a separate chamber and then exits the apparatus.

Other high temperature fuel cell generator apparatus designs are known, where spent fuel is recirculated and aspirated into fresh, preheated feed fuel, in the center of the apparatus, at apparent temperatures of approximately 600° C. to 800° C., which mixture is fed through the fuel cells, as taught in U.S. Pat. No. 3,718,506 (Fischer et al.). There, spent fuel exiting from the fuel cells, is mixed with fresh feed fuel, such as propane, at a jet-pump nozzle, for flow inside of series connected fuel cells. This combination of spent fuel with fresh fuel prevents soot formation within the cells. Additional spent fuel mixes with spent air and flows around and through a catalytic afterburner structure surrounding the fuel cells for complete combustion, which heats the fuel cells, allowing efficient operation at approximately 800° C. In U.S. Pat. No, 4,729,931 (Grimble), spent fuel and combusted fuel are mixed, and then drawn into fresh feed fuel at an ejector nozzle, in an interior chamber of the generator apparatus. The entire mixture then passes through a reforming material, located in the same chamber as the ejector, to form a reformed gas which is fed to contact fuel cells within the apparatus.

Another generator design to prevent chilling of the fuel cells is taught in U.S. Pat. No. 4,808,491 (Reichner) where a combusted exhaust of spent fuel and spent oxidant provides corner heating in the generator apparatus. There, fresh feed fuel is fed into a manifold at the bottom of the apparatus, the bottom of which manifold may contain reforming catalyst and may be heated by the combusted exhaust. The feed fuel then flows parallel to the exterior fuel electrode surfaces of the elongated fuel cells. The fresh feed fuel is not mixed with any spent gases.

Natural gas (methane plus ethane, propane, butane and nitrogen) is a likely fuel for many of these fuel cell apparatus. This natural gas must be reformed, that is, cornered to carbon monoxide and hydrogen, through the use of a catalyst and excess water vapor, prior to its utilization in the fuel cell. The reforming reaction is endothermic, requiring a supply of heat, and is best performed at temperatures close to 900° C. The heat required for reforming is a significant fraction of the excess heat that results from fuel cell operation.

The use of recirculated spent fuel to provide water vapor and $CO_2$ for fresh feed fuel, by means of an ejector powered by the inlet fresh fuel pressure, has the potential to result in several problems. In many instances, the composition of the fresh feed fuel may vary, requiring control of the amount passing through the ejector, and also control of the amount of water vapor laden spent fuel. Also, too great a draw of spent fuel at the ejector, will reduce the Nernst potential in a significant portion of the generating chamber of the apparatus and will result in lower operating voltage or poorer utilization of fuel than desired.

What is needed is an apparatus which allows more efficient heating of internal reforming material, and which controls spent fuel inclusion into the fresh feed fuel. It is one of the main objects of this invention to provide such an apparatus.

SUMMARY OF THE INVENTION

Accordingly, the invention resides in an electrochemical apparatus having a fresh gaseous feed fuel inlet; gaseous feed oxidant inlet; gaseous spent fuel recirculation channel; separate, hot combusted exhaust gas exit channel; a combustion chamber; a generator chamber located between the combustion chamber and a reforming chamber and containing a plurality of electrochemical cells, each cell having an exterior fuel electrode and an interior air electrode; and a reforming chamber containing a reforming material; characterized in that, the spent fuel recirculation channel passes from the generator chamber to combine with the fresh feed fuel inlet at a circulation and mixing apparatus, a reformable fuel channel connects the circulation and mixing apparatus and the reforming chamber, the reforming chamber is connected to the generator chamber, a portion of the hot combusted exhaust gas exit channel surrounds the reforming chamber, and the fresh feed fuel inlet has a by-pass channel into the gaseous spent fuel recirculation channel said by-pass channel having valving to control fresh feed fuel flow to the gaseous spent fuel recirculation channel.

The invention further resides in a high temperature electrochemical apparatus, operating on a gaseous oxidant and a fresh gaseous feed fuel, having fresh gaseous feed fuel inlet; gaseous feed oxidant inlet; gaseous spent fuel recirculation channel; separate, hot combusted exhaust gas exit channel; a combustion chamber where hot spent gaseous fuel and hot spent gaseous oxidant combust to form combusted exhaust gas; a generator chamber located between the combustion chamber and a reforming chamber and containing a plurality of electrochemical cells, each cell having an exterior fuel electrode and an interior air electrode; and a reforming chamber containing reforming material; characterized in that the spent fuel contains water vapor and carbon dioxide, a portion of the spent fuel is recirculated through the spent fuel recirculation channel to mix with fresh feed fuel at a circulation and mixing apparatus providing a reformable fuel mixture which is fed to the reforming chamber through a reformable fuel mixture channel connecting the circulation and mixing apparatus and the reforming chamber, hot combusted exhaust gas is fed through the combusted exhaust gas exit channel which passes around the reforming chamber causing heat transfer from the hot combusted exhaust gas to the reforming material, and where the fresh feed fuel inlet has a by-pass channel into the gaseous spent fuel recirculation channel said by-pass channel having valving to control the flow of fresh feed fuel into the gaseous spent fuel recirculation channel.

The term "fuel electrode" as used herein means that electrode in contact with fuel, the term "air electrode" as used herein means that electrode in contact with air or oxygen, and the term "spent" fuel oxidant, or air as used herein means reacted, depleted fuel or reacted, depleted oxidant or air containing about 5% to 18% oxygen. The term "spent" fuel does not include the mixture of spent fuel combusted with spent oxidant or air, which mixture is herein defined as "combusted exhaust gas". The term "surrounds" as used herein means at least passing around and in contact with a major portion of the side of a vessel.

The use of combusted exhaust gas having a temperature of approximately 1,000° C. as the prime source of thermal energy for the endothermic reformation reaction optimizes recuperative heat exchange in the apparatus. The use of a valving control and by-pass of fresh feed fuel gas flow allows regulation of the amount of spent fuel aspirated at the circulation and mixing device, and thus water vapor and carbon dioxide in the spent fuel that is recirculated. The recirculation fraction will be determined by the desired oxygen-to-carbon ratio in the mixed fuel stream prior to entering the reformer. The channels which carry the combusted exhaust gas and the reformable fuel mixture may be concentric with the reforming chamber, with heat conduction fins providing a recuperative heat exchange between the two gas streams.

BRIEF DESCRIPTION OF THE DRAWINGS

In order that the invention can be more clearly understood, conventional embodiments thereof will now be described, by way of example, with reference to the accompanying drawing, which is a side view in section of one embodiment of an electrochemical cell apparatus according to this invention, showing recirculation of combusted exhaust gas, mixture of spent fuel with incoming fresh feed fuel, and a by-pass channel to route fresh feed fuel directly into the gaseous spent fuel recirculation channel.

DESCRIPTION OF THE PREFERRED EMBODIMENTS

Referring now to FIG. 1, an electrochemical cell apparatus or generator 10 is shown containing two cell bundles 12 and 14, each bundle containing a plurality of parallel, axially elongated electrochemical cells 16, such as solid oxide fuel cells. The cells are located in generator compartment or section 22. Each cell has an exterior fuel electrode 18 covering its axially elongated surface, shown dotted for the sake of clarity, an interior air electrode, and a solid oxide electrolyte between the electrodes (air electrode and electrolyte not shown), as is well known in the art. The air electrode is generally a doped ceramic of the perovskite family, for example, doped $LaMnO_3$, the electrolyte is generally yttria stabilized zirconia, and the fuel electrode is generally a zirconia-nickel cermet material. A calcia stabilized zirconia support for the air electrode can also be used. For a detailed description of the materials and construction of an exemplary fuel cell, reference can be made to U.S. Pat. No. 4,490,444, herein incorporated by reference.

The electrochemical cell apparatus 10 will operate with an interior temperature in the range of about 600° C. to 1,200° C. An outer housing 20 surrounds the entire apparatus. An inner housing, not shown, surrounds a plurality of chambers, including the generator chamber 22 and a combustion chamber 24 and is preferably comprised of a high temperature resistant metal such as Inconel. Thermal insulation 26, such as low density alumina insulation board is contained within the outer housing as shown. Penetrating the housing 20 and insulation 26 is fresh gaseous feed fuel inlet 28, the fresh feed fuel shown as F, and a gaseous oxidant, such as air or oxygen, feed inlet 30, as well as ports for electrical leads and the like, not shown. The generator chamber 22 extends between wall 32 and a porous barrier 34. The porous barrier 34 need not be a sealed structure. The porous barrier 34, in particular, is designed to allow spent fuel gas flow, indicated by arrows 36, between the generator chamber 22, operating at a pressure slightly above atmospheric, and the combustion chamber 24, operating at a slightly lower (but still above atmospheric) pressure.

High temperature, elongated, solid oxide electrolyte cells 16 extend between the combustion chamber 24 and the wall 32. The cells have open ends 44 in the combustion chamber 24, and closed ends in the generator chamber 22 near wall 32. Each individual cell generates approximately one volt on open circuit, and a plurality are electrically interconnected through conducting felts 40, usually nickel fiber metal, preferably in a series-parallel rectangular array, as described in U.S. Pat. No. 4,395,468, herein incorporated by reference.

By way of example, during operation, a gaseous feed oxidant, such as air, is fed through oxidant feed inlet 30, and enters the oxidant feed conduits 42 at a temperature of approximately 500° C. to 700° C., and a pressure above atmospheric, being optionally heated prior to entering the housing by conventional means, such as a heat exchanger coupled with a blower. The oxidant, within the conduits, is passed through the combustion chamber 24, where it is further heated to a temperature of approximately 800° C. to 900° C. by combusted exhaust gas. The oxidant then flows through the length of the oxidant circuit, through the conduits 42 which extend down the inside length of the fuel cells, being further heated to approximately 1,000° C., by virtue of absorbing most of the heat generated during the electrochemical reaction. A smaller fraction of the heat is absorbed by the fuel.

The oxidant is discharged into the closed end bottom of the fuel cells 16. The oxidant within the fuel cells reverses direction, and electrochemically reacts at the inner air electrode along the inside active length of the cells, depleting somewhat in oxygen content as it approaches the open ends 44 of the cells. The depleted oxidant is then discharged into the combustion chamber 24 through the open cell ends 44, and is shown as spent oxidant streams 35. This spent oxidant combusts with depleted fuel, where part of the total depleted fuel passes through porous barrier 34 as shown by arrows 36, to form combusted exhaust gas 47, which exits the apparatus through separate combusted exhaust gas exit channels 45, finally exiting as exhaust gas E. The channels 45 can be made of a high temperature resistant metal, such as Inconel.

In this invention, a gaseous fuel that has not yet been reformed, such as a gaseous hydrocarbon, including hydrocarbons such as methane ($CH_4$), ethane ($C_2H_6$), propane (C$_3$H$_8$), and the like, vaporized petroleum fractions such as naphtha, and alcohols, such as ethyl alcohol (C$_2$H$_5$OH), and the like, and natural gas, that is, a mixture of 85% methane, and 10% ethane with a balance of propane, butane and nitrogen, can be used. These reformable fuel mediums F are fed into the generator through fresh feed fuel inlet 28.

In this invention, a major portion of the hot gaseous spent fuel formed along the axial length of the cells 16 passes to at least one spent fuel recirculation channel 46, which can be made of a high temperature resistant metal such as Inconel. Another portion of the hot spent fuel passes into combustion chamber 24, shown as arrows 36 as previously described, to combust with spent air, shown as arrows 35, and preheat the fresh oxidant feed. The spent fuel recirculation channel 46 passes from the generator chamber 22 to feed into and combine with the fresh feed fuel inlet at a circulation and mixing apparatus 50, which can be of any type known in the art, for example, an ejector, jet pump, aspirator, or the like, which is positioned in a cooler region of the insulation, as shown. This allows recirculation of a portion of the spent fuel fed into channel 46 to mix with the fresh feed fuel at mixer 50, to provide a reformable fuel mixture 51 which passes through reformable fuel mixture channel 64 on route to reforming chamber 54.

The reformable fuel mixture 51 will contain at least water vapor (steam) and usually also H$_2$, CO, and CO$_2$, all contributed by the spent fuel that enters circulation-mixing apparatus 50. Preferably, the volume ratio of spent fuel to fresh feed fuel will be adjusted in the mixer 50 so that approximately 2 volumes to 5 volumes of water vapor and CO$_2$ are added to each volume of fresh feed fuel, when the fuel is natural gas. The presence of water vapor plus a reforming catalyst, most commonly Ni allows conversion of gaseous hydrocarbons to CO+H$_2$, by the reaction:

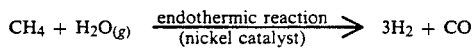

$$CH_4 + H_2O_{(g)} \xrightarrow[\text{(nickel catalyst)}]{\text{endothermic reaction}} 3H_2 + CO$$

The reformable fuel mixture 51 then passes through a reforming chamber 54, shown half in section, containing reforming material 56, such as nickel, or other well known useful reforming material for fuel gas. For example, a nickel salt, such as nickel nitrate, may be impregnated into an alumina based material and then heated to form the nickel oxide and reduced to nickel. The design shown in the Drawing for the reforming chamber 54 is a circular vessel surrounded by the annular portion 45' of the combusted exhaust gas exit channel, allowing heat transfer from channel section 45' to chamber 54. As shown, the channel section 45' almost completely surrounds the sides of the reforming chamber 54 allowing axial combustion gas flow or flow transversely around the central axis of the chamber 54 as shown by arrow 60. The central axis of the reforming chamber would be parallel to arrow 51 in the drawing. The channel section 45' could also completely surround the vessel 54.

The reformed fuel mixture, shown by arrows 58, after passing through the reforming material 56, passes through a series of ports which connect the reforming chamber to the generator chamber, and into the generator chamber 22 portion of the apparatus. The heat transfer surface area of channel 45' passing around the periphery of the reforming chamber 54 is large, so ample opportunity is provided for heating the reforming material 56.

Hot combusted exhaust gas from channel 45 reaches channel 45' at a temperature of approximately 850°C. Thus, channel 45', in contact with the reforming chamber 54, allows recuperative heat transfer between that channel and chamber. An exhaust gas bypass channel (not shown) may be used to adjust the flow of exhaust gas through channel 45', so that the fuel temperature may be controlled at entrance to the generator chamber 22. This may produce a more uniform cell temperature within the generating chamber 22. With regard to the reformer 54, some internal reforming of the reformable fuel mixture can be utilized. Catalytic reforming material can be distributed within the generator chamber on or adjacent to cells or elsewhere in the generator chamber. Nickel fiber felts 40, or the nickel cermet surface 18 of the fuel cells, can be utilized to keep the amount of reforming material 56 relatively small.

Additionally, fresh fuel feed inlet 28 has one or more by-pass channels 62 so that fresh fuel feed can by-pass the aspirating portion of apparatus 50, and flow directly into the gaseous spent fuel exit channel 46, as shown. Each by-pass channel 62 has appropriate valving means or other metering means, as shown, to control the flow of fresh feed fuel into the gaseous spent fuel recirculation channel. This allows control of the quantity of spent fuel gas recirculated through channel 46 into the mixing apparatus 50. Apparatus 50 will usually contain a nozzle from which fresh feed fuel will exit at a high velocity, thereby entraining and circulating the spent fuel gas from channel 46. The amount of by-pass flow through each channel 62 can be varied by the valve V, allowing a reduction in the amount of spent fuel gas, and thus water vapor, entrained within apparatus 50, in order to assure that an appropriate H$_2$O:gaseous hydrocarbon, or O:C ratio is achieved under various operating conditions. A preferred volume ratio of H$_2$O:fresh feed fuel is from approximately (1.2:1) to (3:1), for natural gas fuel.

We claim:

1. An electrochemical apparatus comprising: fresh gaseous feed fuel inlet; gaseous feed oxidant inlet; gaseous spent fuel recirculation channel; separate, hot combusted exhaust gas exit channel; a combustion chamber; a generator chamber located between the combustion chamber and a reforming chamber and containing a plurality of electrochemical cells, each cell having an exterior fuel electrode and an interior air electrode; and a reforming chamber containing a reforming material; where the spent fuel recirculation channel passes from the generator chamber to combine with the fresh feed fuel inlet at a circulation and mixing apparatus, a reformable fuel mixture channel connects the circulation and mixing apparatus and the reforming chamber, the reforming chamber is connected to the generator chamber, a portion of the hot combusted exhaust gas exit channel surrounds the reforming chamber, and the fresh feed fuel inlet has a by-pass channel into the gaseous spent fuel recirculation channel said by-pass channel having valving to control fresh feed fuel flow to the gaseous spent fuel recirculation channel.

2. The apparatus of claim 1, where the chambers are within a metal housing lined with insulation.

3. The apparatus of claim 1, where the electrochemical cells are fuel cells, the air electrode contains doped LaMnO$_3$, the electrolyte is yttria stabilized zirconia and the fuel electrode contains a zirconia-nickel cermet material.

4. The apparatus of claim 1, where the circulation and mixing apparatus is an ejector mechanism.

5. The apparatus of claim 1, where catalytic reforming material is also distributed within the generator chamber on or adjacent to the cells or elsewhere within the generator chamber.

6. The apparatus of claim 1, where heat conduction fins are present at the contact points of the hot combusted exhaust gas exit channel and the reforming chamber.

7. The apparatus of claim 1, where the portion of the hot combusted exhaust gas exit channel which surrounds the reforming chamber produces gas flow transverse to the central axis of the reforming chamber.

8. A high temperature electrochemical apparatus, operating on a gaseous oxidant and a fresh gaseous feed fuel, comprising: fresh gaseous feed fuel inlet; gaseous feed oxidant inlet; gaseous spent fuel recirculation channel; separate, hot combusted exhaust gas exit channel; a combustion chamber where hot spent gaseous fuel and hot spent gaseous oxidant combust to form combusted exhaust gas; a generator chamber located between the combustion chamber and a reforming chamber and containing a plurality of electrochemical cells, each cell having an exterior fuel electrode and an interior air electrode; and a reforming chamber containing reforming material; where the spent fuel contains water vapor and carbon dioxide, a portion of the spent fuel is recirculated through the spent fuel recirculation channel to mix with fresh feed fuel at a circulation and mixing apparatus providing a reformable fuel mixture which is fed to the reforming chamber through a reformable fuel mixture channel connecting the circulation and mixing apparatus and the reforming chamber, hot combusted exhaust gas is fed through the hot combusted exhaust gas exit channel which passes around the reforming chamber causing heat transfer from the hot combusted exhaust gas to the reforming material, and where the fresh feed fuel inlet has a by-pass channel into the gaseous spent fuel recirculation channel said by-pass channel having valving to control the flow of fresh feed fuel to the gaseous spent fuel recirculation channel.

9. The apparatus of claim 8, where the chambers are within a metal housing lined with insulation.

10. The apparatus of claim 8, where the electrochemical cells are fuel cells, the air electrode contains doped $LaMnO_3$, the electrolyte is yttria stabilized zirconia and the fuel electrode contains a zirconia-nickel cermet material.

11. The apparatus of claim 8, where the circulation and mixing apparatus is an ejector mechanism.

12. The apparatus of claim 8, where catalytic reforming material is also distributed within the generator chamber on or adjacent to the cells or elsewhere within the generator chamber.

13. The apparatus of claim 8, where heat conduction fins are present at the points where the hot combusted exhaust gas exit channel surrounds the reforming chamber.

14. The apparatus of claim 8, where the portion of the hot combusted exhaust gas exit channel which surrounds the reforming chamber produces gas flow transverse to the central axis of the reforming chamber.

15. The apparatus of claim 8, where the use of valving in the by-pass channel allows regulation of the amount of spent fuel that is recirculated.

16. The apparatus of claim 8, where the valving allows a volume ratio of $H_2O$:fresh feed fuel of from (1.2:1) to (3:1), for natural gas fuel.

* * * * *